Patented July 18, 1944

2,354,146

UNITED STATES PATENT OFFICE 2,354,146

SOFTENING OF WATER AND THE FLOCCU-
LATION OF SUSPENDED SOLIDS IN
AQUEOUS LIQUIDS

John Oswald Samuel, Swansea, Wales, assignor
to Unifloc Reagents Limited, Swansea, Wales,
a British company No Drawing. Original application February 20,
1940, Serial No. 319,983. Divided and this application February 28, 1941, Serial No. 381,002.
In Great Britain February 23, 1939

13 Claims. (Cl. 210—23)

The present invention is for improvements in or relating to water softening and for the flocculation of suspended solids in aqueous liquids and includes the flocculation of suspended solids in water softening and in the clarification of effluents and certain trade wastes.

This application is divided from my United States patent application Serial No. 319,983, filed February 20, 1940.

In the softening of water, the addition of milk of lime and/or soda ash to cold hard water to precipitate out dissolved salts as carbonates possesses certain disadvantages. Thus, an excess over the theoretical quantity of reagent, or reagents, such as lime and/or soda ash has invariably to be added in order to reduce the hardness to a low figure; in the absence of heat the reaction does not usually proceed to completion; an excess of reagents gives a softened water with a high degree of alkalinity; the precipitates are in most cases difficult to remove by filtration; and there is a tendency for after-precipitation particularly with water containing appreciable quantities of magnesium salts.

It is an object of the present invention to provide a process of water softening which minimises the above-mentioned disadvantages by the employment of a new reagent described and claimed in my co-pending United States patent application Serial No. 319,983.

According to the present invention the process for softening water and for the flocculation of solids suspended therein comprises mixing with the water alkali such as lime and/or soda ash and a proportion of a reagent prepared by reacting aluminium sulphate (or a mixture of sodium or potassium aluminate and sodium or potassium sulphate) and caustic soda or caustic potash and adding starch to the reaction mixture at or above room temperature but not exceeding about 140° C. This temperature is attained by the reaction of the aluminium sulphate with caustic soda or caustic potash, the reaction being carried out only with such external heating as is necessary to initiate the reaction or by the direct heating of the alkali aluminate and caustic alkali.

When the starch is added to the reaction mixture at or about room temperature the paste formed sets on standing to a comparatively hard mass which can be broken up and powdered. At temperatures between room temperature and about 110° C. the paste formed is immediately converted into a hard mass that can be broken up into powder or, if the paste is continuously stirred during the addition of starch, a powdery product is formed without the intermediate hard mass and therefore no subsequent breaking up of the product is required.

The setting of the paste may take as long as two or three hours at 30–40° C. and approximately 10 minutes at 60° C.

The aluminium sulphate may contain water of crystallisation. When the anhydrous salt is used a proportion of water should be added.

The reagent made as above described is added to the water to be softened together with the usual softening chemicals employed in the Clark process of water softening, viz. lime and/or soda ash and this alkali is referred to in the appended claims as alkali as herein defined. The water is softened to a low figure of hardness, for example down to one or two degrees within approximately one hour from the time of introduction of the reagent into the water. The precipitate forms immediately and assumes a flocculated form and settles rapidly, leaving a clear soft water with a low degree of alkalinity.

When the reagent is added, preferably in the form of a dilute solution or suspension, to aqueous suspensions of inter alia coal slurry, clays such as Bentonite, ganister, china clay, flue dust, vegetation, paper pulp and the like, excellent flocculation is obtained on the addition of approximately 0.25 lb. to 1.0 lb. of the reagent per 1,000 gallons of the suspension to be treated. The quantity to be added depends on the conditions. In order to obtain the best results it is important that the suspensions should be made alkaline, e. g., with lime before adding the reagent. The quantity of alkali which should be added to a suspension prior to flocculation in accordance with this invention is approximately 0.5 to 4 lbs. per 1,000 gallons. The concentration of the suspensions for flocculation is assumed to be of such an order that the flocculated particles have reasonably free falling conditions. Thus a coal slurry suspension should contain solids of the order of 5 to 10% clay, e. g., 5% of solids, and vegetation and pulp suspensions 0.10% to 0.50% approximately.

The water softening may be carried out by either a hot or a cold process. The amount of added reagent may be of the order of 0.1 to 0.4 lb. per 1,000 gallons of water and may amount to 2% to 8% on the weight of the calcium hydroxide or the combined weight of the calcium hydroxide and soda ash employed.

The following table indicates the results obtained by using the product of the invention in conjunction with soda ash and calcium hydroxide with four different samples of hard water:

| Water sample | Hardness in parts/100,000 | | Reagents added in lbs./1,000 gallons | | | Residual hardness |
|---|---|---|---|---|---|---|
| | Temporary | Permanent | Soda ash | Calcium hydroxide | Product of the invention | Parts/100,000 |
| A | 4.6 | 9.4 | 1.8 | 1.2 | 0.2 | 2.0 |
| B | 27.0 | Nil | | 4.4 | 0.2 | 2.0 |
| C | 19.0 | 14.0 | 1.4 | 2.5 | 0.3 | 1.5 |
| D | 9.5 | 6.0 | 1.0 | 1.3 | 0.15 | 2.0 |

I claim:

1. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C. and adding starch to the reaction mixture at a temperature not below room temperature and not exceeding 140° C. and removing the precipitate from the water.

2. A process for the softening of water and for the flocculation of solids suspended therein which process comprises adding to the water to be treated an amount equal to 0.5 to 4 lbs. per 1,000 gallons of the water to be treated of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and caustic potash at a temperature not exceeding 140° C., adding starch to the reaction mixture at a temperature not below room temperature and not exceeding 140° C. and removing the precipitate from the water.

3. A process for the softening of water and for the flocculation of solids suspended therein which process comprises adding to the water to be treated an amount equal to 0.5 to 4 lbs. per 1,000 gallons of the water to be treated of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and caustic potash at a temperature not exceeding 140° C., adding starch to the reaction mixture at a temperature not below room temperature and not exceeding 140° C. and removing the precipitate from the water.

4. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$)

and an alkali metal hydroxide at a temperature not exceeding 140° C., cooling the reaction mixture to 30° to 60° C. and adding starch to the reaction mixture and removing the precipitate from the water.

5. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and caustic potash at a temperature not exceeding 140° C., cooling the reaction mixture to 30° to 60° C. and adding starch to the reaction mixture and removing the precipitate from the water.

6. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C., cooling the reaction mixture to 30° to 60° C. and incorporating in the said reaction mixture dry starch in amount substantially one-half that of the aluminum sulphate or alkali metal hydroxide and removing the precipitate from the water.

7. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together aluminum sulphate and an alkali metal hydroxide, the amount of the alkali hydroxide being between 62 and 125% on the weight of the aluminum sulphate (calculated as $Al_2(SO_4)_3.12H_2O$) and incorporating in the reaction mixture starch at a temperature up to 140° C. and in proportion substantially between 15 and 30% by weight on the combined weight of the aluminum sulphate and the alkali metal hydroxide, and removing the precipitate from the water.

8. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together sodium aluminate, sodium sulphate and an alkali metal hydroxide, the proportion of the said alkali metal hydroxide being between 4.5 and 9% on the combined weight of the sodium aluminate and sodium sulphate and incorporating in the said reaction mixture starch at a temperature up to 140° C., the proportion of starch being between 28 and 60% on the combined weight of the alkali metal hydroxide and sodium aluminate and sodium sulphate, allowing the product to cool and set to a hard mass and grinding the said mass to powder and removing the precipitate from the water.

9. A process for the softening of water and flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C. and incorporating in the said reaction mixture starch in amount substantially one-half that of the aluminum sulphate or alkali metal hydroxide and removing the precipitate from the water.

10. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C. and adding to the reaction mixture 1 to 10% by weight of soft soap on the weight of the reaction mixture and incorporating in the said reaction mixture starch in amount substantially one-half that of the aluminum sulphate or alkali metal hydroxide and removing the precipitate from the water.

11. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C. and adding to the reaction mixture 0.5 to 5% by weight of hard soap on the weight of the reaction mixture and incorporating starch in the mixture in amount substantially one-half that of the aluminum sulphate or alkali metal hydroxide and removing the precipitate from the water.

12. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C. and adding to the reaction mixture a substance selected from the group consisting of dialkali phosphate and trialkali phosphate in amount equal to 5% by weight on the weight of the reaction mixture and incorporating starch in the mixture in amount substantially one-half that of the aluminum sulphate or alkali metal hydroxide and removing the precipitate from the water.

13. A process for the softening of water and the flocculation of solids suspended therein which process comprises adding to the water to be treated an amount equal to 0.5 to 4 lbs. per 1,000 gallons of the said water of an alkali as herein defined and mixing with the water 0.1 to 1 lb. per 1,000 gallons of the said water of a reagent produced by reacting together substantially equal amounts of aluminum sulphate ($Al_2(SO_4)_3.12H_2O$) and an alkali metal hydroxide at a temperature not exceeding 140° C. and adding starch to the reaction mixture at a temperature not below room temperature and not exceeding 140° C. the amount of starch being substantially one-half that of the aluminum sulphate or alkali metal hydroxide and incorporating in the product a proportion of lime and removing the precipitate from the water.

JOHN OSWALD SAMUEL.